United States Patent [19]

Frieder et al.

[11] Patent Number: 5,335,345
[45] Date of Patent: Aug. 2, 1994

[54] DYNAMIC QUERY OPTIMIZATION USING PARTIAL INFORMATION

[75] Inventors: Gideon Frieder, Syracuse, N.Y.; Ophir Frieder, Basking Ridge, N.J.

[73] Assignee: Bell Communications Research, Inc., Livingston, N.J.

[21] Appl. No.: 508,265

[22] Filed: Apr. 11, 1990

[51] Int. Cl.$^5$ .............................................. G06F 15/40
[52] U.S. Cl. .............................. 395/600; 364/DIG. 2; 364/974; 364/974.4; 364/974.6; 364/974.7; 364/949.5
[58] Field of Search ........................................ 395/600

[56] References Cited

U.S. PATENT DOCUMENTS

| 4,769,772 | 9/1988 | Dwyer | 364/300 |
| 4,829,427 | 5/1989 | Green | 364/200 |
| 5,237,678 | 8/1993 | Kuechler et al. | 395/600 |

OTHER PUBLICATIONS

Dynamic Query Evaluation Plans, Goetz Graefe et al., ACM, pp. 358–366, 1989.
A Detailed Statistical Model for Relational Query Optimization, B. Muthuswamy et al., ACM, pp. 439–448, 1985.
"Distributed Query Processing", C. T. Yu et al., Computing Surveys, vol. 16, No. 4, pp. 399–433, Dec. 1984.
"Progressive Access Plan Selection for Relational Database Systems", Y. H. Lee et al., IBM Technical Report, pp. 1–25, Sep. 1, 1987.
"Hash–Partitioned Join Method Using Dynamic Destaging Strategy", M. Nakayama et al., 14th International Conference on Very Large Data Bases, pp. 1–11, Aug. 1988.
"Estimation of the Number of Tuples Satisfying a Query Expressed in Predicate Calculus Language", R. D. Demolombe, IEEE, pp. 55–63, 1980.
"Selectivity Estimation and Query Optimization in Large Databases With Highly Skewed Distributions of Column Values", C. A. Lynch, Proceedings of the 14th VLDB Conference, pp. 240–251, Los Angeles, Calif., 1988.
"Site Assignment for Relations and Joint Operations in the Distributed Transaction Processing Environment", D. W. Cornell et al., Proc. Fourth Int'l. Conf. on Data Eng., pp. 100–108, Feb. 1988.

Primary Examiner—Gareth D. Shaw
Assistant Examiner—Kakali Chaki
Attorney, Agent, or Firm—Leonard Charles Suchyta; James W. Falk

[57] ABSTRACT

A method for executing a query comprising a sequence of operations to be performed on one or more relational databases comprises statistically sampling the relational databases at the times the operations are to be executed and then dynamically optimizing the performance of the operations based on the statistical samples obtained as a result of the sampling step.

4 Claims, 8 Drawing Sheets

FIG. 2A $R_2$

| A | B | C |
|---|---|---|
| 1 | 6 | 4 |
| 2 | 6 | 4 |
| 3 | 4 | 1 |
| 4 | 9 | 2 |

$R_1$

| D | A |
|---|---|
| 8 | 1 |
| 9 | 5 |

FIG. 2C $P_{R_2.B, R_2.C}(R_2) =$

| B | C |
|---|---|
| 4 | 1 |
| 6 | 4 |
| 9 | 2 |

FIG. 2B $S_{R_2.B=6}(R_2) =$

| A | B | C |
|---|---|---|
| 1 | 6 | 4 |
| 2 | 6 | 4 |

FIG. 2D $R_2[ABC] \bowtie R_1[DA] =$

| A | B | C | D |
|---|---|---|---|
| 1 | 6 | 4 | 8 |

FIG. 7A
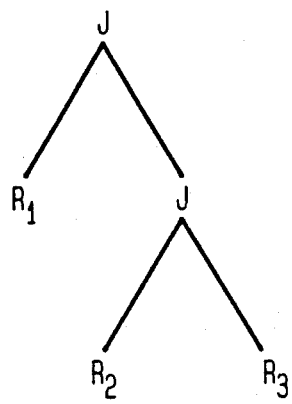
FIG. 7B
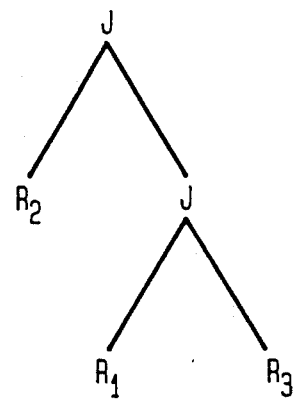
FIG. 7C
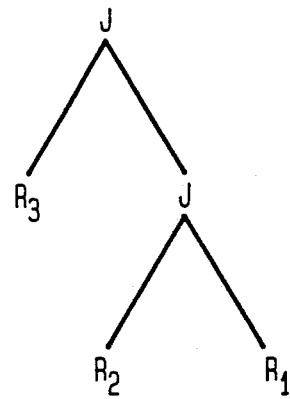
FIG. 8A
$R_1$
| PART_ NO. | COLOR | WEIGHT |
|---|---|---|
|  |  |  |
FIG. 8B
$R_2$
| PART_ NO. | MANUFACTURE | COST |
|---|---|---|
|  |  |  |
FIG. 8C
$R_3$
| CITY | COUNTRY_ OF_ ORIGIN | MANUFACTURE |
|---|---|---|
|  |  |  |

…

DYNAMIC QUERY OPTIMIZATION USING PARTIAL INFORMATION

FIELD OF THE INVENTION

The present invention relates to the optimization of queries to be performed on relational databases by single or distributed processor systems. More particularly, the present invention relates to the dynamic optimization of queries to be performed on distributed relational databases by distributed processing systems through the use of partial or statistical information.

BACKGROUND OF THE INVENTION

A database is defined as a collection of items, organized according to a data model and accessed via queries. The present invention is concerned with relational databases. In a relational database or relation, the data are organized in columns, with each column comprising one attribute of the relation. Each column or attribute of a relation has a domain which comprises the data values in that column. One row of a relation, which includes one value from each attribute, is known as a tuple.

From its initial conception in the late 1960's until today, the relational database has evolved so that it is now utilized in a large number of commercially available database systems which execute on the entire range of computer systems from personal computers to mainframes.

A variety of operations may be performed on a relation database. (See e.g., C. T. Wu et al, "Distributed Query Processing", Computing Surveys, Vol. 16, N.Y. Dec. 1984). Some of these operations are the select, project, and join operations. When these operations are executed on one or more relations, other relations result. The select operation involves selecting those tuples of relation R whose A attribute value is equal to a specified constant C. This select operation is denoted by $R \cdot A = C$ or $S_{R \cdot A = C}$. Operators other than equal such as "greater than", "less than" or "not equal" are allowed.

The projection of relation R on a set of attributes T is denoted by $R \cdot T$ or $P_{R \cdot T}$ and is obtained by discarding all columns of R that are not in T and eliminating duplicated rows.

The join of relation $R_2$ having the attributes A, B, and C with relation $R_1$ having attributes D and A on the common joining attribute A is denoted by $R_2[ABC] \times R_1[DA]$ or by the symbol J. The join is obtained by concatenating each row of $R_1$ with each row of $R_2$ whenever the A attribute values of the two rows are equal. Since this operation results in two identical columns, one column may be eliminated. If there is no common joining attribute, the join operation involves forming a complete cartesian product of the two relations by concatenating all rows in one relation with all of the rows of the other relation.

In order for a user to access particular information from a relational database system, a query compiler comprising part of a database management system converts a user request into a query. A query is comprised of a set of operations performed on one or more input relations to yield a resulting relation which contains information desired by a user. The set of operations forms an access plan which enables the user to obtain particular information from a database system comprising one or more relations. The set of operations is typically arranged in a hierarchy known as a query tree. In general, queries are utilized to access particular information from one or more relational databases.

Queries may be carried out in a distributed processing system. The term distributed processing system includes multiprocessor and multicomputer systems. A multiprocessor system refers to a system comprising a plurality of tightly coupled processors which share the same operating system control and resources (e.g. disks, printers, CPU's, and memories). A multicomputer system comprises a plurality of independent computers interconnected via a network, wherein each computer controls its own resources. In such systems, a distributed operating system may be utilized to hide computer boundaries from the standard user.

As the volume of data that user applications store, retrieve and manipulate continues to grow, efficient processing of user requests, namely queries, becomes fundamental. Otherwise, the high computation time and inefficient use of resources associated with queries that access large databases becomes prohibitive for the user.

To reduce processing time and to utilize resources efficiently, the execution of queries must be optimized. Query optimization involves minimizing I/O, memory, and CPU requirements to provide a lower expected processing cost for carrying out the operations comprising a query. To accomplish this, query optimization is concerned with, 1. operation optimization, i.e., optimizing the execution of particular operations;
2. site selection optimization, i.e., optimizing the distribution of one or more relations over particular processing sites in a distributed system to optimize execution of particular operations;
3. order optimization, i.e, optimizing the order in which the operations of a query are performed.

Query optimization may be static or dynamic (see, e.g., Y. H. Lee et al, "Progressive Access Plan, Selection For Relational Data Base Systems", IBM Technical Report, Sep. 1, 1987; Goetz Graefe et al, "Dynamic Query Evaluation Plans", Association for Computing Machinery, 1989; M. Nakayama et al, "Has Partitioned Join Method Using Dynamic Destaging Strategy", 14th International Conference on Very Large Data Bases, Aug., 1988; R. Demolombe, "Estimation of the Number of Tuples Satisfying a Query Expressed in Predicate Calculus Language", IEEE, 1980; C. A. Lynch, "Selectivity Estimation and Query optimization in Large Databases With Highly Skewed Distributions of Column Values", Proceedings of the 14th VLDB Conference, Los Angles, Calif., 1988; B. Muthuswamy et al, "A Detailed Statistical Model for Relational Query optimization," Association For Computing Machinery, 1985).

To understand the difference between the static and dynamic query optimization strategies, it is useful to consider the processing of a query in three stages. The first stage is the user input stage wherein the user communicates to a database management system a request for information. The second stage involves use of a query compiler or query translator comprising part of the database management system to convert the user request into a set of database operations which form an access plan to obtain the information requested by the user. The third stage involves execution of the set of operations to obtain the information for the user.

The sequence of operations or access plan is optimized to the extent possible by the query compiler or query translator during the second stage mentioned above. This optimization is referred to as static query optimization. Static query optimization utilizes information about the relations to be operated on that is available prior to execution time to optimize operation ordering, site selection, and operation execution time. Such information includes for example data storage locations and attribute value distributions. However, static optimization may yield non-optimal execution schemes. The non-optimal schemes result from utilizing predetermined information, which may be the best information available at the time of query compilation, but may not actually reflect the state of certain relations during the actual execution. In particular, it is difficult to optimize an operation in the middle of a query tree during the compilation stage because the characteristics of the input relations to this operation are not fully known until the immediately preceding operations are executed. This is often the case when the immediately preceding operations are highly biased value dependent operations such as certain selection and join operations.

To overcome the limitations of static query optimization, dynamic query optimization may be utilized. Dynamic query optimization involves optimization of a query as part of its execution during the third (i.e., execution) stage mentioned above. When dynamic query optimization is utilized, the statically optimized access plan provided by the query compiler during the second (i.e. compilation) stage mentioned above is further optimized during the execution stage using currently available information which was not available during the compilation stage. In particular, during the execution stage, based on information which becomes available during the execution, the access plan is further optimized by optimizing the order in which certain operations are executed, or the site at which certain operations are executed in a distributed processing system, or the execution of an operation itself (e.g., by minimizing the number of comparisons utilized to execute an operation). The idea is to delay or refine the access plan selection decisions, which cannot be made meaningfully at compile time, until run time when the uncertainty on the information is reduced. This provides the access plan with some self correction capability to improve or change its course as more information becomes available.

In short, query optimization is crucial to relational database performance. The static query optimization approach selects an access plan with the minimum projected cost at compilation time based on then available estimated measures of the relations involved. Since these estimates can deviate substantially from their true values during actual query execution, the selected access plan may be far from optimal. In the dynamic query optimization approach, the compiler generates an approximate access plan which is further optimized at run time based on information which becomes available at run time. Thus, instead of using inaccurate precomputed information about the relations to optimize the access plan, accurate information obtained at run times is utilized.

A shortcoming of currently available dynamic query optimization approaches is that there is a significant processing overhead stemming from the large volume of data that must be characterized to carry out the optimization. Thus, the overhead required to carry out presently available dynamic query optimization schemes may outweigh the efficiencies gained in the actual query optimization.

In view of the foregoing, it is an object of the present invention to provide a technique to dynamically optimize queries to be performed on relational databases. More particularly, it is an object of the present invention to provide a dynamic query optimization technique which does not involve the analysis of large volumes of data but instead uses partial or statistical information obtained from the relations to be operated on at the time of optimization, which is at or just before execution time.

SUMMARY OF THE INVENTION

The present invention is a method for dynamically optimizing and executing a set of one or more operations forming all or part of a query. The present invention is especially useful for dynamically optimizing multiscan operations such as project and join operations.

At the time the set of one or more operations is to be optimized, the one or more relational databases on which the operations are to be performed are statistically sampled. Algorithms which utilize the statistical samples are then executed to optimize the operations. Because only small statistical samples of the relational databases are utilized and because the algorithms are simple and fast, the inventive method is utilized to dynamically optimize relational database operations during query execution. Thus, the operations are optimized using current information available during execution rather than a priori information which does not accurately reflect the characteristics of the relations being operated on.

The inventive technique of dynamic query optimization utilizing statistical samples obtained during execution of a query is useful for operation execution optimization, site selection optimization, and operation order optimization.

The inventive technique is especially useful in optimizing the execution of a join operation in a distributed processing system.

In general, the joining of two relations involves comparing each tuple of one relation with all tuples of the other relation and concatenating two tuples whenever the joining attribute is equal.

In a distributed processing system, this can be accomplished in two ways. The first method, known as broadcast-based join, broadcasts every tuple of the smaller relation to all of the processing nodes. Then, each tuple from the smaller relation can be compared with the tuples of the subset of the larger relation located at each processing node. Thus, in a broadcast-based join only the smaller relation is distributed across the network. This is advantageous when the two relations are of very different sizes. The disadvantage of the broadcast-based join is that there are many redundant comparisons as each tuple from the smaller relation is compared with all the tuples of the larger relation.

Alternatively, a bucket-based join may be utilized. In a bucket-based join, a plurality of ranges (i.e., buckets) for the joining attribute are determined. The ranges are determined so that the total number of tuples from the two relations in each range are approximately equal. Each range is associated with one of the processing nodes. The two relations are then redistributed among the processing nodes, so that each node receives the tuples from both relations having a joining attribute value in the associated range. In this case, instead of comparing each tuple of the first relation with all tuples of the second relation, each tuple of the first relation is only compared with the tuples of the second relation at the same node and belonging to the same joining attribute value range. Thus, it is a significant advantage of the bucket-based join that many redundant comparisons are eliminated. It is also a significant advantage of the bucket-base join that each processor performs an approximately equal amount of work as measured by a suitable work function. The tradeoff is that both relations have to be redistributed.

The optimization technique of the present invention is especially useful for optimizing the execution of a bucket-based join.

To implement this approach, at run time, statistical samples of the relations to be joined are obtained from the processing sites or nodes in a distributed processing system and utilized to define the bucket ranges. In this manner, the bucket ranges are defined based on the actual state of the relations at execution time rather than based on precomputed information available at compilation time which may or may not accurately reflect the state of the relations at execution time. The bucket ranges determined using the samples are then mapped to the processing nodes and the relations to be joined are redistributed so that the tuples of each relation are located at the corresponding processor. Thus, like the bucket range determination, site selection is performed based on the actual state of the relations at execution time rather than based on precomputed information available at compilation time. Therefore, the present invention results in a highly optimized execution of a bucket join operation.

In short, the query optimization approach of the present invention is dynamic and hence benefits from the exploitation of current information. However, unlike other dynamic optimization techniques, the invention involves only a partial sampling of the relations involved, thereby significantly reducing the overhead incurred by the optimization scheme.

For example, to redistribute two relations having a combined total of 10 million tuples over a four node system so as to join the two relations, it is only necessary to take a statistical sample of ten thousand tuples, or one-tenth of one percent of the two relations to determine the bucket ranges. In particular, to optimize the execution of the join such that each of the four processing nodes does an equal amount of work, the total number of tuples from both relations at each node should be approximately equal (i.e., the number of tuples from each relation at a node may be unequal, but the total number of tuples at each node should be equal). When one-tenth of one percent of the tuples are used to form the statistical samples, errors (i.e., deviation from equal number of tuples at each node) are on the order of two or three percent.

Thus, the query optimization approach of the present invention enables one to realize the benefits of dynamic optimization without suffering from the high processing overhead previously associated with dynamic query optimization.

BRIEF DESCRIPTION OF THE DRAWING

FIGS. 2A, 2B, 2C and 2D schematically illustrate relational databases and operations which may be performed on relational databases.

FIGS. 7A, 7B, and 7C illustrates a query fragment whose execution is dynamically optimized using statistical information in accordance with an illustrative embodiment of the present invention.

FIGS. 8A, 8B, 8C illustrate relational databases which are used in a dynamically optimized query in accordance with an illustrative embodiment of the present invention.

DETAILED DESCRIPTION OF THE INVENTION

The detailed description of the invention is divided into a plurality of subsections. Subsection A describes a distributed processing system, explains some important operations which can be performed on relational databases residing in the distributed processing system and provides some illustrative examples of these operations. Subsection B shows how queries may be used to access information contained in relational databases. Subsection C presents some algorithms in which statistical information obtained immediately prior to execution is used to optimize relational database operations. Subsection D shows how the algorithms of Subsection C may be used to dynamically optimize a query.

A. Relational Database Operation

Before describing the present invention in detail, it may be helpful to briefly review some of the operations which may be performed on relational databases and how these operations may be combined to form queries. Illustratively, the relational databases are resident in a distributed processing system.

Figure 1:
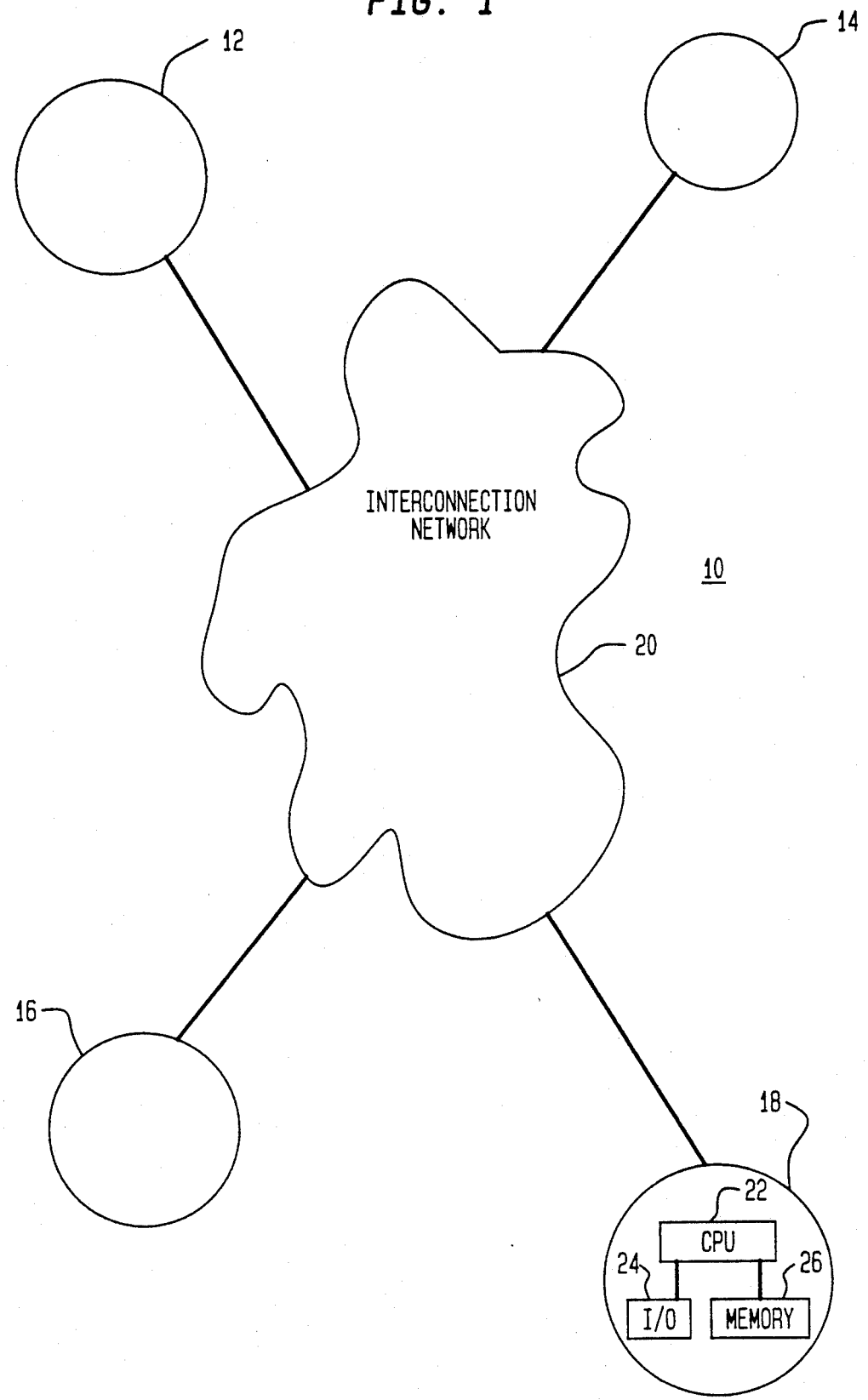
FIG. 1 schematically illustrates a distributed processing system.

FIG. 1 schematically illustrates a distributed processing system 10. The distributed processing system 10 comprises the nodes 12, 14, 16, 18 and an interconnection network 20 so that the nodes can communicate with each other. As shown in connection with the node 18, each node comprises a central processing unit (CPU) 22, input/output (I/O) device 24, and a memory 26.

FIG. 2A schematically illustrates two relational databases $R_1$ and $R_2$. The attributes or columns of $R_2$ are A, B and C and the attributes of $R_1$ are D and A. Each row in the relations $R_1$ and $R_2$ is a tuple of the corresponding relation. In a distributed processing system, the tuples of a particular relational database may be distributed among a plurality of nodes.

FIG. 2B illustrates a select operation which is denoted by $R_2 \cdot B = 6$ or $S_{R_2} \cdot B = 6$. This operation involves forming a new relation by finding all the rows or tuples in the relation $R_2$ in which the B attribute is equal to 6. The resulting relation is illustrated in FIG. 2B.

The select operation is known as a single scan operation. In a single scan operation, each row or tuple is utilized or scanned only once, there are no multiple comparisons wherein each tuple is compared to a plurality of other tuples.

FIG. 2C illustrates a project operation which is denoted by $R_2 \cdot B$, $R_2 \cdot C$ or $P_{R_2 \cdot B, R_2 \cdot C}$. This operation is performed by keeping only the B and C attributes of the relation $R_2$ and eliminating any duplicate rows or tuples. The resulting relation is illustrated in FIG 2C. The project operation is a multiple scan operation, wherein each tuple in a relation is scanned or utilized multiple times. In particular, in a project operation, each tuple is compared with every other tuple to eliminate duplicate tuples. The present invention is especially concerned with the dynamic optimization of multiple scan operations to be executed in distributed processing systems.

FIG. 2D illustrates a join operation which is denoted by $R_2[ABC] \times R_1[DA]$. (A join operation may also be denoted by the symbol J). The relations $R_2$ and $R_1$ have a common attribute A which serves as a joining attribute. The join operation is performed by comparing each row in $R_1$ with all the rows of $R_2$ and concatenating a row in $R_1$ with a row in $R_2$ when the two rows have equal values for the joining attribute A. Since this results in two identical columns in the resulting relation, one such column is eliminated. FIG. 2D shows the relation resulting from the above-stated join operation. As indicated previously, if there is no common attribute, two relations are joined by concatenating each row from one relation with all rows from the other relations, i.e., a full cartesian product is formed. Note that since a join involves comparing each row or tuple of one relation with all rows or tuples of another relation, it is a multiple scan operation. As indicated previously, a join in a distributed processing system may be carried out using a broadcast-based operation or a bucket-based operation.

Figure 3A:
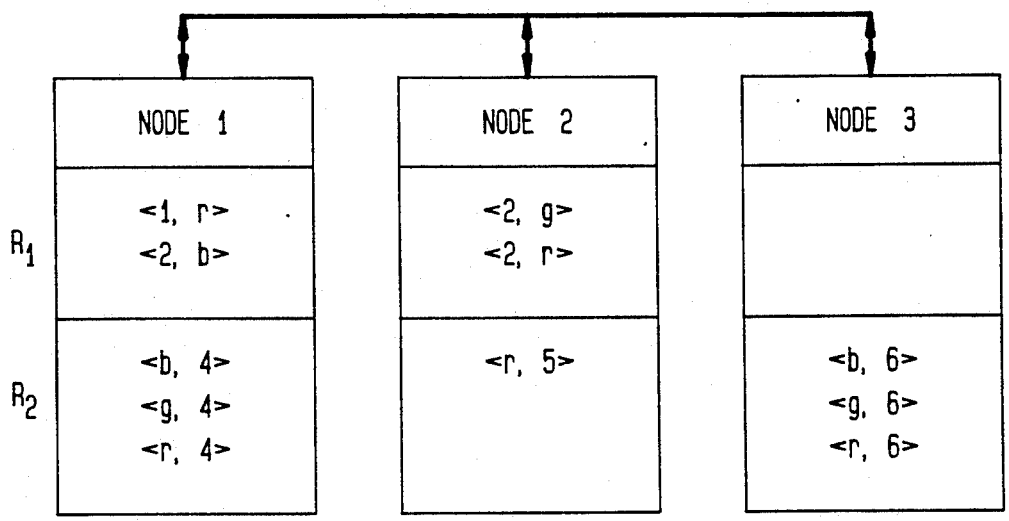
FIGS. 3A, 3B, and 3C schematically illustrate a broadcast-based join of two relational databases.
Figure 3B:
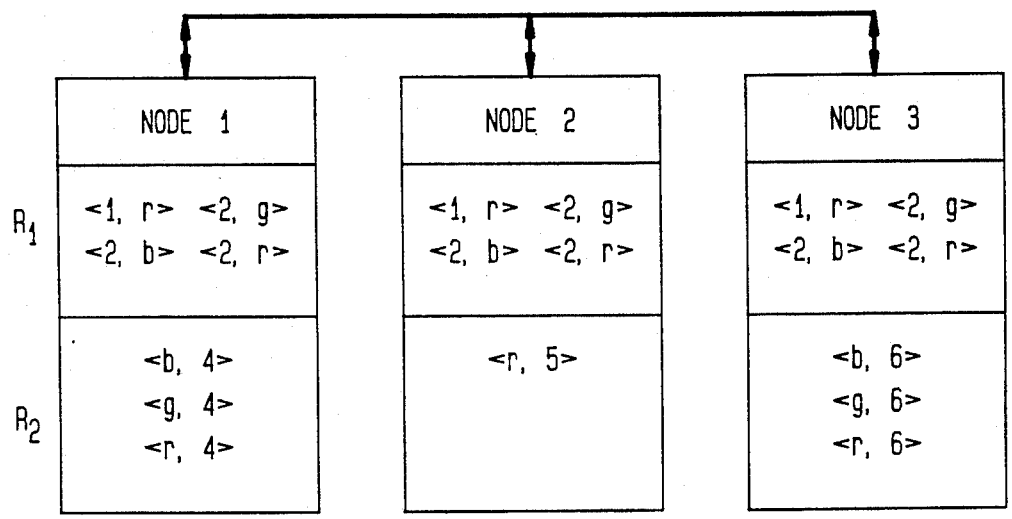
Figure 3C:
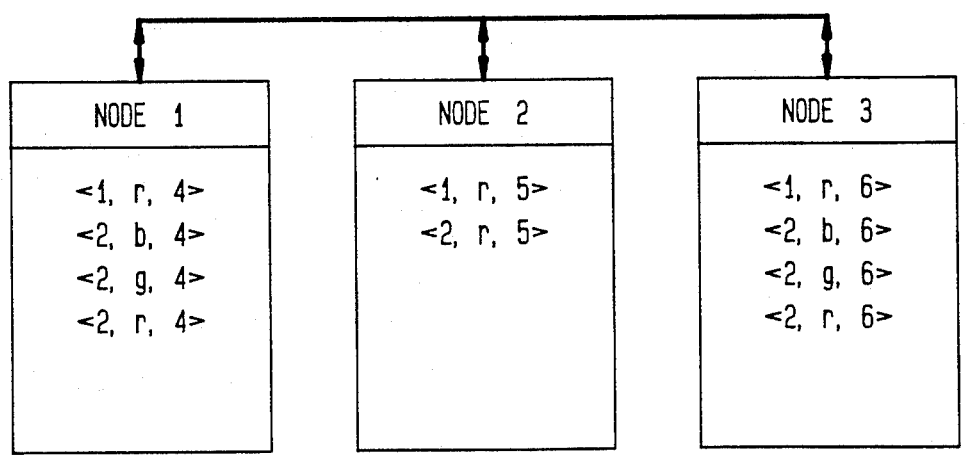

FIGS. 3A, 3B and 3C illustrate a broadcast-based join. In FIGS. 3A, 3B, 3C, three nodes of a distributed processing system are illustrated. The initial state of the system is shown in FIG. 3A wherein two relations $R_1$ and $R_2$ are distributed over the three nodes, with some tuples of $R_1$ being located at Node 1 and Node 2 and some tuples of $R_2$ being located at each of Node 1, Node 2, and Node 3. The two relations $R_1$ and $R_2$ are to be joined, with the joining attribute taking on the values r, b, and g. To accomplish this join, the smaller relation is broadcast to all nodes. Thus, as shown in FIG. 3B, all the tuples of $R_1$ have been distributed to Node 1, Node 2, and Node 3. The join is now performed by comparing each tuple of $R_1$ with the subset of tuples of $R_2$ present at each node. When the joining attribute of a tuple from $R_1$ is equal in value to the joining attribute of a tuple from $R_2$, the two tuples are concatenated, with the duplicate attribute being eliminated. The tuples of the relation resulting from the join of $R_1$ and $R_2$ at each of the nodes is shown in FIG. 3C.

As indicated previously, the advantage of the broadcast-based join is that only the smaller relation is redistributed. The disadvantage is that there are many redundant comparisons.

Figure 4A:
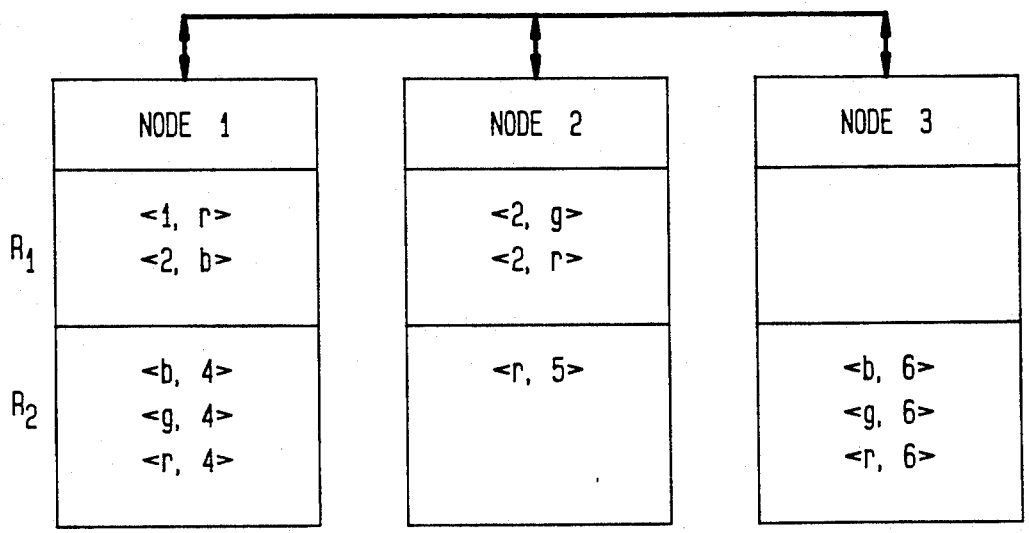
FIGS. 4A, 4B, 4C schematically illustrate a bucket-based join of two relational databases.
Figure 4B:
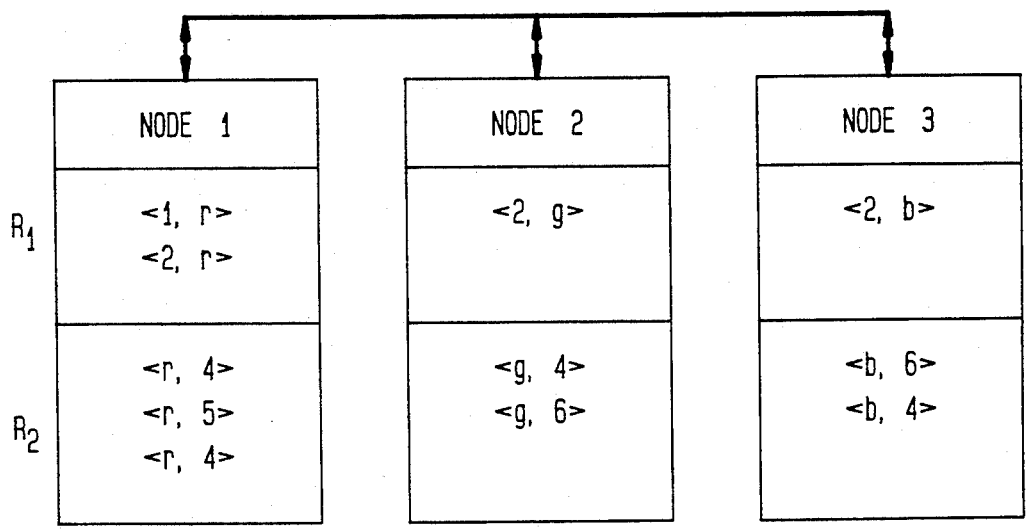
Figure 4C:
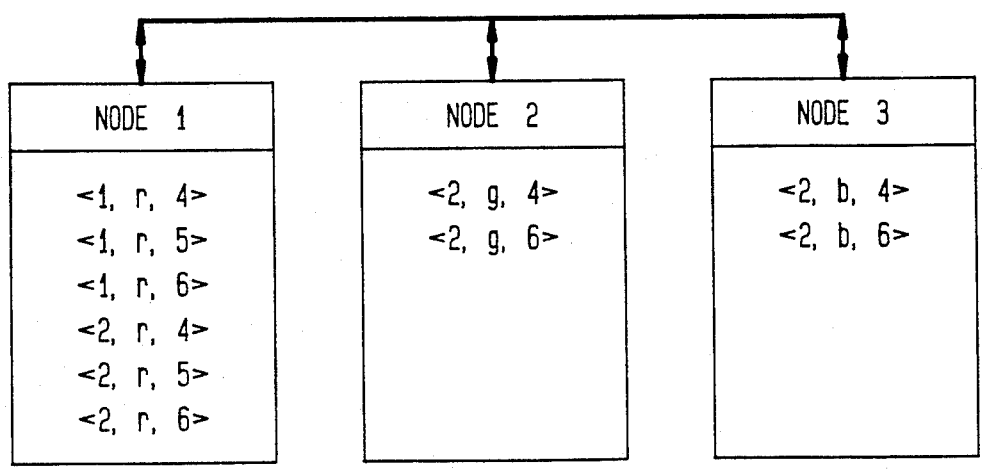

As an alternative to a broadcast based join, a bucket based join may be utilized. FIGS. 4A, 4B, 4C illustrate the joining of the relations $R_1$ and $R_2$, this time using a bucket-based procedure. In the bucket based procedure, the tuples of both relations $R_1$ and $R_2$ are redistributed, so that only tuples in a particular range of the joining attribute are present at each node. The initial state of the system is shown in FIG. 4A. FIG. 4B shows how the relations $R_1$ and $R_2$ are redistributed so that tuples with an r joining attribute value are located at Node 1, tuples with a g joining attribute value are at Node 2, and tuples with the b joining attribute value are at Node 3 (i.e. there are three ranges or buckets of the joining attribute, with each range having one value). The relation resulting from the join of $R_1$ and $R_2$ and the distribution of the tuples in this relation is shown in FIG. 4C. The disadvantage of the bucket-based join is that both relations have to be redistributed. The advantage of the bucket based join is that most redundant comparisons are eliminated.

The project operation may also be carried out using a bucket-based procedure. As indicated above, a project operation typically involves keeping only certain attributes (i.e. columns) of a relation and then eliminating duplicates from the resulting tuples. In the most general approach, to eliminate duplicates, it is necessary to compare each tuple with every other tuple. In a distributed processing system, this may involve transmitting all tuples to one of the nodes and then performing all of the comparisons.

A bucket-based procedure can be used to eliminate redundant comparisons in the execution of a project operation. The tuples of a relation can be divided into ranges, illustratively with each range at one node in a distributed processing system so that comparisons are only made between tuples in a particular range.

B. Query Formulation and Execution

As indicated above, a query may be defined as a set of operations performed on one or more input relations to yield a resulting relation which contains information desired by the user. The operations comprising a query are typically arranged in a hierarchy known as a query tree.

Figure 5:
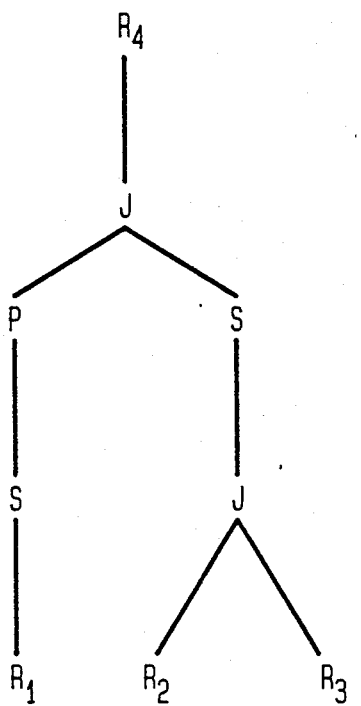
FIG. 5 illustrates a query tree formed from a hierarchy of relational database operations.

An example of a query tree is shown in FIG. 5. The query tree of FIG. 5 utilizes three input or base relations $R_1$, $R_2$, and $R_3$. A set of operations including select (S), project (P) and join (J) are executed to obtain a resulting relation $R_4$.

Figure 6:
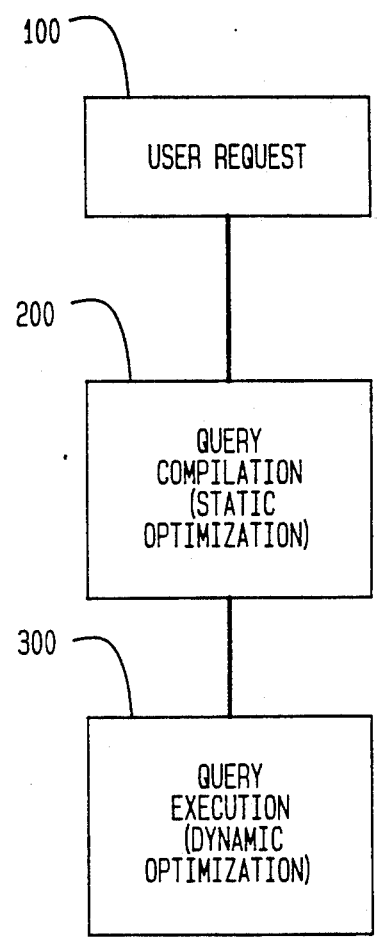
FIG. 6 illustrates in block diagram form the stages of query formation and execution.

The three stages of query formulation and execution are illustrated in block diagram form in FIG. 6. In the first stage 100, the user formulates a request for information and transmits it to a database management system. In the second stage 200 of FIG. 6, a query translator or query compiler forming part of the database management system converts the user request into a query tree which comprises a hierarchical arrangement of relational database operations as shown in FIG. 5. These operations are statically optimized during the second compilation stage using information about the relational databases to be operated on that is available at this time.

The query is then executed in the third or execution stage 300. In accordance with the present invention, the operations forming part of the query tree are further optimized during the execution stage using information which becomes available during the execution. To significantly reduce the overhead necessary to accomplish this optimization, the present invention utilizes statistical information about the databases to be operated obtained immediately prior to the execution of particular operations during the execution stage 300. For example, in the query tree of FIG. 5, it is not really possible to optimize the uppermost join operation until some of the prior operations in the query tree are performed and the relations that are actually to be joined are available. As indicated previously, the present invention utilizes statistical information to accomplish this dynamic optimization.

Figure 10:
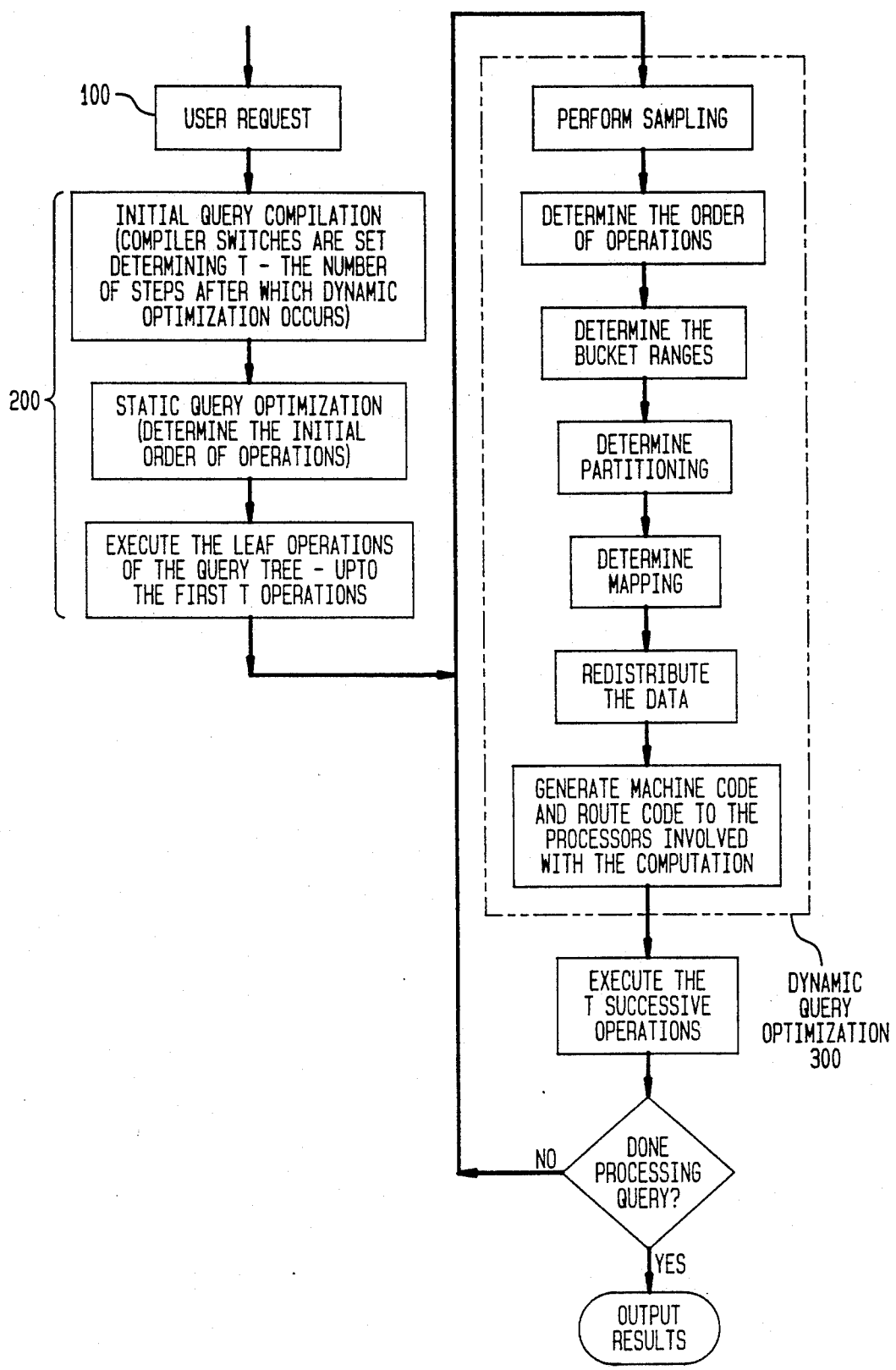
FIG. 10 is an expanded flow chart diagram of the stages of the invention depicted in FIG. 6 and particularly illustrating the method steps comprising the dynamic query optimization.

FIG. 10 is an expanded version of FIG. 6 showing particularly the various steps in this embodiment of our invention, as discussed further below in Section D with reference to a specific example of dynamic query optimization using statistical information.

Statistical Optimization of Relational Database Operations

To show how statistical information can be used to optimize relational database operations, the following example is utilized. Consider three relations $R_1[ABC]$, $R_2[BDE]$ and $R_3[CFG]$ where the quantities inside the brackets indicate the attributes of each relation. Illustratively, each of the three relations $R_1$, $R_2$, and $R_3$ has 100,000 tuples.

Consider a query fragment (i.e. a portion of a query tree) which requires the joining of the three relations. Three orderings of the necessary operations are possible. These three possibilities are shown in FIGS. 7A, 7B and 7C. In FIG. 7A, $R_2$ and $R_3$ are first joined and the resulting relation is joined with $R_1$. In FIG. 7B, $R_1$ and $R_3$ are first joined and the resulting relation is then joined with $R_2$. Similarly, in FIG. 7C, $R_2$ and $R_1$ are first joined and then the resulting relation is joined with $R_3$.

The option of FIG. 7A will be immediately rejected by any query optimizer since there is no common joining attribute for relations $R_2$ and $R_3$. Executing the first join between $R_2$ and $R_3$ in the option of FIG. 7A will require the formation of a complete cartesian product between $R_2$ and $R_3$ resulting in a relation having $10^{10}$ tuples. The second join in FIG. 7A then requires joining $10^{10}$ tuples by 100,000 tuples. Thus, no statistical optimization technique is required to eliminate the option of FIG. 7A.

To choose between the options of FIGS. 7B and 7C a statistical optimization technique is utilized in accordance with the present invention. Illustratively, the following algorithms may be utilized.

Algorithm I

1. Obtain equally sized statistical samples of $R_1 \cdot B$, $R_2 \cdot B$ (B is the joining attribute between $R_1$ and $R_2$) $R_1 \cdot C$, $R_3 \cdot C$ (C is the joining attribute between $R_1$ and $R_3$)
2. Sort all samples
3. With a matching algorithm (e.g. a linear matching algorithm) compute the number of matches between $R_1 \cdot B$ sample and $R_2 \cdot B$ sample—call it $N_1$, and $R_1 \cdot C$ sample and $R_3 \cdot C$ sample—call it $N_2$
4. If $N_2 < N_1$ then Option C
   else Option B The basis for this algorithm may be understood as follows. A join operation is optimized when the number of comparisons needed to execute the join operation is minimized. In the present example, the order of the operations should be chosen so that the relation resulting from the first join is as small as possible. This means that the second join will involve a minimum number of comparisons. Thus, in effect, the algorithm above utilizes statistical samples to predict whether $R_1[ABC] \times R_3[CFG]$ (Option B) or $R_2[BDE] \times R_1[ABC]$ (Option C) will have fewer tuples. This is accomplished using statistical sampling in the foregoing algorithm.

The algorithm stated above, for each of options B and C, samples the input relations and determine the number of times the joining attributes have equal values in the samples of the input relations (i.e. determines the number $N_1$ and $N_2$). The smaller of the two numbers is therefore indicative of which of the two options will produce a smaller relation as a result of the first join step.

The foregoing algorithm for determining operation order is especially advantageous because it is simple and fast to execute and utilizes statistical samples which are only a tiny fraction of the relational database involved. Thus, the foregoing algorithm can be carried out during the execution of a query to dynamically optimize a join operation.

In contrast, the prior art static optimization techniques use a priori information. However, in many cases suitable a priori information is unavailable, especially when the operations to be optimized are in the middle of a query tree and the input relations to the operations are not yet known.

After it is decided in which order to perform the two join operations of the query fragment of FIGS. 7A, 7B, 7C, in a distributed processing system, it is necessary to determine the site or sites at which the operations will be carried out. For example, a bucket-based join operation is carried out most efficiently if each processor does an equal amount of work. Each processor does an equal amount of work (as defined by a suitable work function) if the total number of tuples (i.e the sum of the tuples from the first relation and the tuples from the second relation) at each processing site is approximately equal.

To redistribute two relations to be joined so that there is an equal number of tuples at each processing site, ranges are defined for the joining attribute such that there is an equal number of tuples in each range and then each range is assigned to a processing site. In accordance with the present invention, the redistribution is accomplished by an algorithm which utilizes statistical information.

The following algorithm may be used to join two relations $R_1$ and $R_2$ which have a common joining attribute.

Algorithm II

1. Determine the overlapping range of the joining attribute, and eliminate tuples from both relations which are not in the overlapping range.
2. Determine the number $n_1$ of relevant tuples (i.e tuples in the overlapping range) in $R_1$ and the number $n_2$ of relevant tuples in $R_2$.
3. Choose a sample size S.
4. $M_1 = Sn_1/(n_1+n_2)$ (total number of samples to be taken from $R_1$)
5. Select $(R_{1,i} \times M_1)/R_1$ samples from $R_1$ at processing site i, where $R_{1,i}$ is the number of relevant tuples of $R_1$ at processing site i. Select $(R_{2,i} \times M_2)/R_2$ samples from $R_2$ at processing site i, where $R_{2,i}$ is the number of relevant tuples of $R_2$ at processing site i.
6. Collect and sort all samples from both $R_1$ and $R_2$.
7. Partition the samples into equal ranges.
8. Using a site selection algorithm (e.g., see, D. W. Cornell et al, "Site Assignment for Relations and Join Operations in the Distributed Transaction Processing Environment", Proceedings Fourth International Conference on Data Engineering, Feb., 1988), map the ranges to the processor sites.
9. Redistribute the relevant tuples of the relations $R_1$ and $R_2$ so that all relevant tuples are at the appropriate sites.

The underlying basis of this algorithm is to use statistical samples of the actual relations involved to determine the distribution of the joining attribute and thus the bucket ranges. Because only a very small sample size is needed, the algorithm may be utilized dynamically during execution. In contrast, the prior art static optimization technique uses a priori information about the distribution of the join attribute, if available, to optimize the join. If available at all, such a priori information is generally inaccurate because it does not reflect the state of the relations actually being joined, especially if the relations in questions were utilized in prior operations in the query.

As indicated above, only an extremely small fraction of each relation needs to be sampled to determine the ranges and to determine the range-to-processor site mapping. For relation sizes ranging from $10^6$ to $10^7$ tuples, the sample sizes need only be in the range of 0.1 to 1% of the relation sizes to achieve deviations on the order of 1% or less from the desired equal number of tuples at each processing site.

D. Example of Dynamic Query Optimization Using Statistical Information

In the previous section some algorithms based on statistics for optimizing relational database operations were described. The present section shows how those algorithms may be applied to optimize a typical query dynamically, i.e., while the query is being executed.

An auto-repair shop needs to obtain an American-made blue fender to complete a repair. To locate the part, the shop employee must access the parts database. The relational database system employed at this shop stores the relevant data in three relations, $R_1$[Part No., Color, Weight], $R_2$[Part No., Manufacture, Cost], and $R_3$[City, Country of Origin, Manufacture]. Part numbers 1 to 100000 are reserved for fenders under the database scheme employed. The structure of the database is shown in FIGS. 8A, 8B, 8C which illustrate the format of the relations $R_1$, $R_2$ and $R_3$.

Figure 9A:
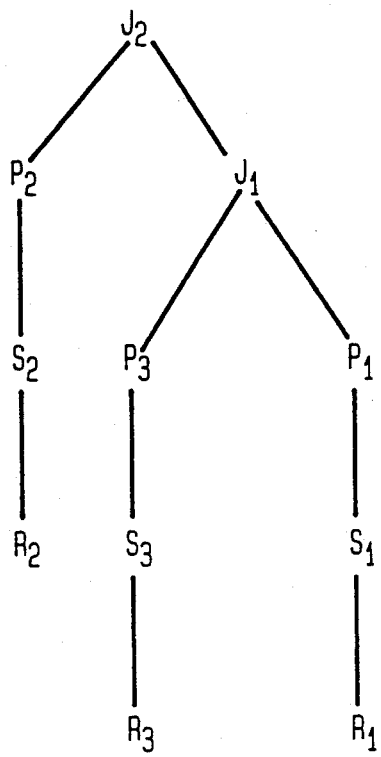
FIGS. 9A, 9B, and 9C illustrate query trees which indicate a pattern of operations to be performed on the relational databases of FIGS. 8A, 8B, 8C.
Figure 9B:
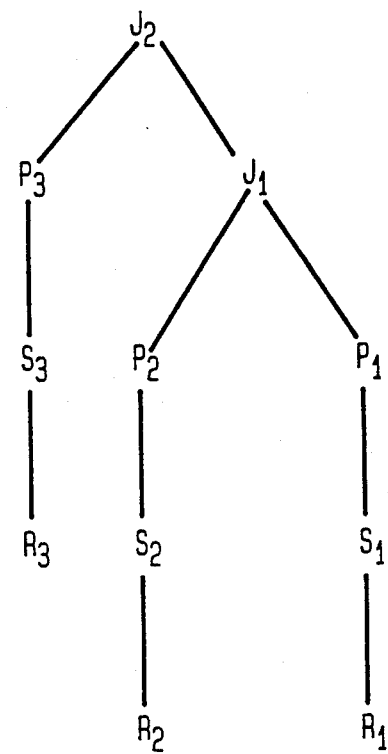
Figure 9C:
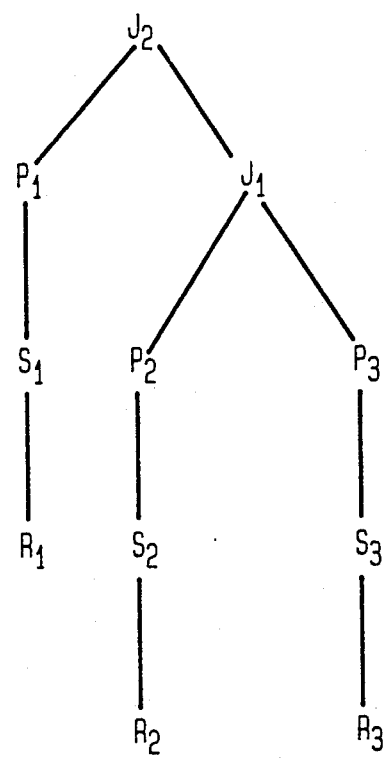

To compute this query, assuming the above database organization, the following computation is required:

$Project_{\text{Part No.,Color}}(Select_{\text{Part No.} = 1 \text{ to } 10000, \text{Color} = \text{BLUE}}(R_1))$
JOIN
$Project_{\text{Part No.,Manufacture}}(Select_{\text{Part No.} = 1 \text{ to } 10000}(R_2))$
JOIN
$Project_{\text{Manufacture,Country of Origin}}(Select_{\text{Country of Origin} = \text{US}}(R_3))$ Traditionally, query optimizers order the operation execution such that the input to a select operation is an initial base relation and that the output of a select operation is the input to a project operation, if a project is required. In other words, the leaves of a typical query tree are select operations whose output relations form the input relations for the subsequent project operations. Thus, the above sample query has three candidate query execution strategies. The respective query trees are shown in FIGS. 9A, 9B, and 9C, respectively. In FIGS. 9A, 9B, and 9C, projection $P_i$ operates on the output relation of selection $S_i$ whose input is the relation $R_i$. Thus, all three query trees start out with the same select and project operations and differ in the order in which the join operations are performed.

The optimization technique of the present invention is used to optimize the sample query. In other words, the optimization technique of the present invention is utilized to choose between the query trees of FIGS. 9A, 9B, and 9C.

Query execution starts by performing the $S_1$, $S_2$ and $S_3$, operations on the databases $R_1$, $R_2$ and $R_3$. Since the select operation is a single scan operation no special optimization technique is generally required.

After select operations are performed, the project operations $P_1$, $P_2$, $P_3$ are performed on the relations which result from the $S_1$, $S_2$, and $S_3$ operations. The project operations are multiscan operations and thus may require some optimization especially in a distributed processing system. A project operation may be optimized in a distributed processing environment by sampling the relations involved, utilizing the samples to define ranges of the relevant attribute so that there are an equal number of tuples in each range, and then assigning each range to one processing site.

For purposes of the present example, it is assumed that the project operations $P_1$, $P_2$ and $P_3$ are being executed in an optimized fashion.

For the sake of illustration and without loss of generality, assume that the output relations of $P_1$, $P_2$, and $P_3$, are roughly comparable in size, say 1000 tuples each. Consider the above-identified execution schemes of FIG. 9A, 9B, and 9C.

Option number 1 of FIG. 9A must immediately be rejected since there are no common attributes for the output relations of operations $P_1$ and $P_3$. Executing option 1 results in a complete cross product of the output relations of operations $P_1$ and $P_3$ in the first join, $J_1$. Thus, the succeeding join, $J_2$, is an unnecessarily large 1000000 by 1000 tuple join.

The inventive technique for query optimization is now utilized to select between options 2 of FIG. 9B and option 3 of FIG. 9C. Special emphasis is given to the advantages obtained by sampling data at run time, namely without a priori knowledge.

Define $P_1'$, $P_2'$, and $P_3'$ as the output relations generated by the projections $P_1$, $P_2$, and $P_3$, respectively. Algorithm I above (see Section C) may then be utilized to determine the order in which the joins are performed as follows.

Algorithm

1. Obtain an equally sized sample of each of $P_1'$.Part No., $P_2'$.Part No.,$P_2'$.Manufacture, and $P_3'$.Manufacture. Call the samples $P_1'$.Part No.$_{sample}$, $P_2'$.Part No.$_{sample}$, $P_2'$.Manufacture$_{sample}$, and $P_3'$.Manufacture$_{sample}$, respectively.
2. Sort all samples.
3. Using a matching algorithm compute the number of matches between $P_1'$.Part No.$_{sample}$ and $P_2'$.Part No.$_{sample}$—call it $N_1$
   and
   $P_2'$.Manufacture$_{sample}$, and $P_3'$.Manufacture$_{sample}$—call it $N_2$ If $N_1 < N_2$ then OPTION 2
   ELSE OPTION 3.

In this example, the sampling algorithm is performed as part of the execution of $P_1$, $P_2$, and $P_3$. Thus, the time to obtain each sample is insignificant in comparison to the total join execution time. Note also that the decision as to ordering the join operations is made by sampling the databases actually to be joined as these databases are formed during query execution and is not made using a priori information during the query compilation stage. It is a particular advantage of the present invention that no a priori information is needed. Typically, database systems maintain a priori information characterizing the distribution of only certain attributes of the database. In contrast, since the algorithms of the present invention require no a priori information, they can be used with any attribute.

Furthermore, even if information were available, for example, on the distribution of the manufacture attribute prior to query execution, this available attribute distribution information is relevant to $R_2$ and $R_3$, not necessarily to $P_2'$ and $P_3'$ since prior operations, e.g., $S_2$, and $S_3$, may have significantly modified the distribution.

Continuing with the example, assume that the samples were taken, and the sample matches were determined. As the statistical samples do represent the population, consider the situation in which $N_1 = 100$ and $N_2 = 5$. From these values, it is likely that $P_1'$[Part No, Color] $|x|$ $P'$[Part No., Manufacture] will yield significantly more tuples than $P_2'$[Part No.,Manufacture] $|x|$ $P_3'$[Country of Origin,Manufacture].

Let $n_1$ be the number of tuples produced by
$P_1'$[Part No.,color]$|x|$
$P_2'$[Part No.,Manufacture].

Let $n_2$ be the number of tuples produced by
$P_2'$[Part No.,Manufacture] $|x|$
$P_3'$[Country of Origin,Manufacture].

The algorithm set forth above based on statistical information predicts that $n_1 > n_2$.

Hence,

OPTION 2 results in:
JOIN 1: comprising 1000 tuples by 1000 tuples yielding a $n_1$ tuple relation.
JOIN 2: comprising $n_1$ tuples by 1000 tuples.

OPTION 3 results in:
JOIN 1: comprising 1000 tuples by 1000 tuples yielding a $n_2$ tuple relation.
JOIN 2: comprising $n_2$ tuples by 1000 tuples.

OPTION 3 is clearly the best option. Our sampling approach chooses option 3 dynamically based on sampled information obtained at run time ($P_1'$·Part No.$_{sample}$, $P_2'$·Part No.$_{sample}$, $P_2'$·Manufacture$_{sample}$, and $P_3'$·Manufacture$_{sample}$).

Continuing with the example, unbeknown to the shop employee, the parts database is not resident on a single computer. In fact, the database is partitioned over several nodes. However, as the access terminal the employee was using is ultimately connected to a distributed environment, the employee did not need to worry about the details of the actual query execution or the residence of the database. What follows is a description of the actual execution.

The ordering of operations was computed at run time, namely dynamically, based on sampled data. However, the sampled information was used not only to determine the operation execution sequence but also to improve the performance of the individual operations.

To compute $J_1$, as both input relations $P_2'$ and $P_3'$ are comparable in size, a bucket-based join solution is employed. The sampled data is used to partition the range of buckets, using the algorithm II above (see Section C) as follows.

Algorithm

1. Determine the common range of $P_2'$·Manufacture, and $P_3'$·Manufacture, and remove all tuples from both relations whose Manufacture attribute value is not within the common range.
2. Obtain $P_2'$·Manufacture$_{sample}$, and $P_3'$·Manufacture$_{sample}$ from each node. The sample size obtained from each node per relation depends on the fraction of the local $P_2'$ and $P_3'$ tuples as compared to the total number of $P_2'$ and $P_3'$ tuples.
3. Collect all the local samples. Sort the collected set.
4. Partition the sorted sample set into equal ranges.

Note that if the distribution of the manufacture attribute is skewed, e.g., more American manufacturers than any other foreign manufacturer, the inventive algorithm will automatically account for the skew.

Although the bucket ranges are computed based on sampling as shown above, the actual execution site, namely which processor is to house which bucket, must still be determined.

Assume that the nodes of the multicomputer employed by the repair shop are geographically distributed, then the dominant component in execution site selection is data volume routing. To reduce the volume of data routed, the database manager utilizes the sample data to map the bucket ranges to processors, as shown in the Algorithm II above.

Thus, by dynamically sampling data, the above described sample query was dynamically optimized with respect to operation ordering, the site selection, and the actual individual operation execution.

Conclusion

A method for dynamically optimizing queries using statistical or partial information has been disclosed. The inventive method has two main features: the use of algorithms based on statistical samples to optimize relational database operations and the application of these algorithms during run time as opposed to compilation time. Finally, the above described embodiments of the inventions are intended to be illustrative only. Numerous alternative embodiments may be devised by those skilled in the art without departing from the spirit and scope of the following claims.

What is claimed is:

1. A method applied post-compilation time for operating a data processing system having a relational database to dynamically optimize and execute a set of operations forming all or part of a query, based on the state of the data at the time of execution, said set comprising a plurality of operations and said method comprising, in sequential order, at the time said set of operations is to be executed, statistically sampling at least one relation resident in said relational database of said data processing system on which said set of operations is to be executed, first executing an algorithm utilizing the statistical samples obtained as a result of said sampling step to determine the order in which said plurality of operations are to be executed based on the samples obtained during said sampling step to optimize said set of operations based on the state of the data at the time of said sampling step, said first executing step including executing the set of operations on the samples in at least one order of execution and selecting the order of execution that results in the best performance for said data processing system, and second executing on said data processing system said set of operations on said at least one relation in an order selected by said first executing step.

2. A method applied post-compilation time for operating a data processing system having a relational database and including a plurality of nodes to dynamically optimize and execute sets of operations forming all or part of a query, based on the state of the data at the time of execution, said method comprising, in sequential order, at each of a plurality of times said sets of operations are to be executed, statistically sampling at least one relation on which said set of operations is to be executed, said at least one relation being distributed over a plurality of nodes and said sampling comprising obtaining at least one sample of each of said at least one relation from each of said nodes, first executing an algorithm utilizing the statistical samples obtained as a result of said sampling step, said step of executing an algorithm including a step of ascertaining a plurality of ranges for the values of at least one attribute to said samples, observing the values of the ranges obtained from said samples to determine whether redistribution is necessary in order to result in the best performance for the data processing system, and, in response to such determining if indicated by the values obtained from said samples, redistributing all or part of said at least one relation among said nodes so that the tuples from said at least one of said relations at each node have a value of said at least one attribute which falls in a corresponding one of said ranges resulting in a better resource utilization, thereby to optimize said set of operations based on the state of the data at the time of said sampling step, and second executing on said data processing system said set of operations on said at least one relation, as optimized by said first executing step.

3. A method applied post-compilation time for dynamically optimizing and executing a query of data in a relational database system, which query is divisible into a plurality of query fragments each of which comprises a sequence of at least one operation to be performed by at least one processor on at least one input relational database resident in said at least one processor, the query to be executed to produce at least one resulting relational database, said method comprising the sequential steps of first statistically sampling in at least one processor at least a first input relational database of a first of said query fragments at the time the first query fragment is to be executed and, based on the first statistical sampling of the data then existing in said first input relational database, executing an algorithm to determine an optimized order of execution of the operations of said first query fragment, executing the operations of said first query fragment in the optimized order to produce at least a first resulting relational database, said first resulting relational database of said first query fragment serving as a second input relational database for a second of said query fragments, and second statistically sampling in at least one processor said second input database at the time the second input query fragment is to be executed and, based on the second statistical sampling of the data then existing in said second input relational database, executing an algorithm by at least one data processor to determine an optimized order of execution of the operations of said second query fragment, and executing the operations of the second query fragment in the optimized order to produce at least a second resulting relational database, wherein the step of executing an algorithm with respect to each of the first and second query fragments includes the steps of executing the operations in the respective query fragment in at least one order of execution on the samples obtained in the respective one of the first and second sampling steps, and selecting an order of execution of operations in the respective query fragments that results in the best performance of the at least one processor.

4. A method applied post-compilation time for dynamically optimizing and executing a plurality of operations forming part of a query by a data processing system having a relational database on at least one relation based on the state of the data at the time of execution, said method comprising, in sequential order, at the time said operations are to be executed, statistically sampling said at least one relation resident in said relational database of said data processing system on which said set of operations is to be executed, utilizing the statistical samples obtained as a result of said sampling step to determine the order in which said operations are to be performed, based on the then existing state of said relations, said utilizing step including the steps of executing the set of operations on the samples in at least one order of execution and selecting the order of execution that results in the best performance for the data processing system, and executing said set of operations on said at least one relation by said data processing system in the order selected by said utilizing step.

* * * * *